 (12) United States Patent
Matsumiya et al.

(10) Patent No.: US 9,285,201 B2
(45) Date of Patent: Mar. 15, 2016

(54) FORM MEASURING INSTRUMENT (71) Applicant: MITUTOYO CORPORATION, Kawasaki-shi, Kanagawa (JP)

(72) Inventors: Sadayuki Matsumiya, Kawasaki (JP); Kazuhiko Hidaka, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 82 days.

(21) Appl. No.: 14/190,452

(22) Filed: Feb. 26, 2014

(65) Prior Publication Data
US 2014/0237834 A1 Aug. 28, 2014

(30) Foreign Application Priority Data

Feb. 28, 2013 (JP) ................................. 2013-039485

(51) Int. Cl.
*G01B 5/20* (2006.01)
*G01B 3/00* (2006.01)
*G01B 5/28* (2006.01)
*G01B 7/28* (2006.01)
*G01B 7/34* (2006.01)

(52) U.S. Cl.
CPC *G01B 5/20* (2013.01); *G01B 3/008* (2013.01); *G01B 5/28* (2013.01); *G01B 7/28* (2013.01); *G01B 7/34* (2013.01)

(58) Field of Classification Search
CPC ........ G01B 7/012; G01B 5/012; G01B 21/04; G01B 5/008; G01B 5/20; G01B 7/28; G01B 7/34; G01B 3/008; G01B 11/007

USPC ............................................ 33/546, 551, 553
See application file for complete search history.

(56) References Cited

U.S. PATENT DOCUMENTS

| 5,189,806 A  * | 3/1993  | McMurtry et al. ............... 33/503 |
| 6,209,217 B1 * | 4/2001  | Tsuruta et al. ................... 33/554 |
| 6,307,084 B1 * | 10/2001 | Matsuki et al. .................. 33/503 |
| 6,327,788 B1 * | 12/2001 | Seddon et al. ................... 33/551 |
| 6,354,012 B1 * | 3/2002  | Pettersson ....................... 33/503 |
| 6,546,642 B1   | 4/2003  | Dall'Aglio et al. |
| 8,336,223 B2 * | 12/2012 | Nakayama et al. ............. 33/550 |

(Continued)

FOREIGN PATENT DOCUMENTS

| JP | 60-161503 | 8/1985 |
| JP | 06-129810 | 5/1994 |

(Continued)

OTHER PUBLICATIONS

European Search Report dated Apr. 24, 2014, 6 pages.

*Primary Examiner* — Yaritza Guadalupe-McCall
(74) *Attorney, Agent, or Firm* — Rankin, Hill & Clark LLP (57) ABSTRACT

A form measuring instrument includes: a body; a movable member including: a stylus holder being rotatably supported by the body; a stylus being held by the stylus holder; and a tip being provided at an end of the stylus and being contactable with a workpiece surface; a measurement-force-applying unit being adapted to generate a rotation force acting on the stylus holder to bring the tip of the stylus into contact with the workpiece surface; a displacement detector being provided to a portion of the stylus holder to detect a displacement of the stylus holder resulting from a rotation thereof; and a vibration generator being adapted to apply vibration to the stylus holder.

12 Claims, 7 Drawing Sheets

(56) References Cited

U.S. PATENT DOCUMENTS

| | | | |
|---|---|---|---|
| 8,578,619 B2* | 11/2013 | Nakajima | 33/503 |
| 8,949,071 B2* | 2/2015 | Takanashi | 33/553 |
| 2002/0005062 A1 | 1/2002 | Matsuki et al. | |
| 2012/0204435 A1* | 8/2012 | Nakajima | 33/503 |
| 2014/0237834 A1* | 8/2014 | Matsumiya et al. | 33/503 |

FOREIGN PATENT DOCUMENTS

| | | |
|---|---|---|
| JP | 2001-091206 | 4/2001 |
| JP | 2003-240700 | 8/2003 |
| JP | 2008-026128 | 2/2008 |
| WO | 2007/129082 | 11/2007 |

* cited by examiner

FORM MEASURING INSTRUMENT

The entire disclosure of Japanese Patent Applications No. 2013-039485 filed Feb. 28, 2013 is expressly incorporated by reference herein.

TECHNICAL FIELD

The present invention relates to a form measuring instrument used to measure a surface profile of a workpiece.

BACKGROUND ART

A form measuring instrument with a tip of a stylus that is brought into contact with a workpiece surface and moved therealong in a predetermined measurement direction has been used to measure the workpiece surface (see Patent Literature 1: JP-A-6-129810).

In such a contact-type form measuring instrument, a contact condition of the tip of the stylus on a workpiece surface comes to affect a measurement result as the measurement accuracy improves.

For instance, during the scanning movement of the tip of the stylus on a workpiece surface, the tip of the stylus sometimes temporarily sticks to the workpiece surface due to friction therebetween and unsticks in the next moment, resulting in a non-smooth movement (i.e., stick-slip).

Further, when a workpiece surface has a step, a projection or the like, the tip of the stylus having been moved along the workpiece surface is likely to be caught by such a portion to be hindered from continuously moving along the workpiece surface thereafter.

In order to avoid the above-described influence of friction, some recent form measuring instruments are designed to exhibit a reduced measurement force for pressing the tip of the stylus on a workpiece surface.

It is also disclosed that a stylus has a tip subjected to a low-friction coating using a diamond-based material or the like to suppress friction coefficient (see Patent Literature 2: JP-A-2003-240700).

Further, it is disclosed that a tip of a stylus is vibrated during a movement along a workpiece surface, thereby reducing a friction force between the tip of the stylus and the workpiece surface (see Patent Literature 3: JP-A-2001-91206).

However, a reduction in a measurement force to reduce a friction force between a tip of a stylus and a workpiece surface as described above is accompanied by a decrease in the rigidity of a contact portion, so that a high-speed measurement becomes difficult to perform and thus operating efficiency is lowered.

Additionally, a low-friction coating using a diamond-based material or the like generally costs a lot and thus increases the cost of a form measuring instrument.

When a method such as vibrating a tip of a stylus is employed, a form measuring instrument is inevitably subject to structural limitations.

Specifically, when a form measuring instrument has such an arrangement that a stylus having one end provided with a tip is cantilevered, a friction force between the tip of the stylus and a workpiece surface can be reduced by vibrating a tip-side of the stylus. According to the above arrangement, a profile of the workpiece surface with which the tip of the stylus is in contact is detected by detecting a displacement of a portion of the stylus opposite to the tip-side, so that even when vibration is applied to the tip-side of the stylus to cause a bending deformation of the tip-side of the stylus along with the vibration, the measurement result is unaffected because the measurement is performed in the vicinity of the tip of the stylus.

In contrast, in a form measuring instrument having such an arrangement that a stylus having one end provided with a tip is supported by a rotary measurement arm or stylus holder and the rotation of the stylus holder is detected to measure a displacement of the tip of the stylus, for instance, when only the stylus is vibrated to undergo a bending deformation, a relationship between a displacement of the tip of the stylus and a rotation angle of the stylus holder cannot be maintained and thus the displacement of the tip of the stylus cannot be detected by a detector near the stylus holder.

A lot of form measuring instruments employ such an arrangement that a tip of a stylus is displaced by rotation for a great flexibility in the installation position of a detector. With such an arrangement, detection may be performed, for instance, at the backside of the tip of the stylus instead of the distal side of the stylus. In view of the above, for a form measuring instrument with a tip of a stylus that is displaced by rotation, it has been strongly demanded to stabilize the contact condition between a workpiece surface and the tip of the stylus.

SUMMARY OF THE INVENTION

An object of the invention is to provide a form measuring instrument, in which a tip of a stylus is displaced by rotation, capable of bringing the tip of the stylus into stable contact with a workpiece surface.

According to an aspect of the invention, a form measuring instrument includes: a body; a movable member including: a stylus holder being rotatably supported by the body; a stylus being held by the stylus holder; and a tip being provided at an end of the stylus and being contactable with a workpiece surface; a measurement-force-applying unit being adapted to generate a rotation force acting on the stylus holder to bring the tip of the stylus into contact with the workpiece surface; a displacement detector being provided to a portion of the stylus holder to detect a displacement of the stylus holder resulting from a rotation thereof; and a vibration generator being adapted to apply a vibration to the stylus holder.

In the above aspect, the movable member, the measurement-force-applying unit and the displacement detector may be provided by corresponding arrangements used in a typical form measuring instrument if appropriate.

The movable member may have such an arrangement that the tip of the stylus extends in a direction perpendicular to a longitudinal direction of the stylus and the stylus holder or in the same direction as the longitudinal direction if appropriate. The stylus holder is preferably rotatably supported by a casing or a frame as the body of the form measuring instrument via a ball bearing or a sliding bearing using a low-friction material.

The measurement-force-applying unit may have such an arrangement that a mechanical spring or an elastic member made of an elastomeric material is interposed between the body and the stylus holder to bias the stylus holder to rotate around the turn shaft thereof (i.e., a mechanical arrangement). Alternatively, the measurement-force-applying unit may have such an arrangement that an electromagnetic coil is used to apply electromagnetic suction or reaction to the stylus holder to bias the stylus holder to rotate around the turn shaft thereof (i.e., an electromagnetic arrangement). Further alternatively, the measurement-force-applying unit may have such an arrangement that a balance weight, the position of which is adjustable relative to the turn shaft, is set on one of both sides of the turn shaft of the stylus holder that are equalized in weight, and the position of the balance weight is adjusted to unbalance the weight of the stylus holder, thereby biasing the stylus holder to rotate around the turn shaft thereof (i.e., a gravity-type arrangement).

Examples of the displacement detector, which is only intended to detect a displacement of a portion of the movable member (the tip of the stylus, the stylus and the stylus holder), are a non-contact displacement detector that performs a distance measurement based on electromagnetic or optical principles and a displacement detector that converts a mechanical movement into an electric signal.

Examples of the vibration generator are a variety of actuators capable of vibration, i.e., a periodic mechanical movement, in response to an input signal. Among the above, an electrostrictive element such as a piezoelectric element is especially usable. Such an element, which is simple in structure and cost-friendly, contributes to providing a reliable measurement result.

According to the above aspect of the invention, the movable member, the measurement-force-applying unit and the displacement detector provide basic measurement functions of a form measuring instrument.

Further, regarding the movable member and the vibration generator, the movable member is vibrated by the vibration generator to vibrate the tip of the stylus during the scanning movement of the tip of the stylus on the workpiece surface, thereby reducing the friction force of the tip of the stylus on the workpiece surface to let the tip of the stylus continuously and smoothly move on the workpiece surface.

In the above aspect of the invention, it is preferable that the vibration applied by the vibration generator include a first vibration that makes the stylus holder move around a turn shaft thereof.

With the above arrangement, since the movable member is vibrated in a rotating direction thereof by the vibration generator, the tip of the stylus is periodically moved toward and away from the workpiece surface, thereby most effectively reducing the friction force.

Incidentally, according to the invention, the frequency of the vibration is preferably maximized as long as the frequency of the vibration is different from the natural frequency of the movable member. When the frequency of the vibration is equal to the natural frequency, the movable member resonates with the applied vibration, so that the movable member is in an unstable state until coming back to rest even after the vibration is stopped. Accordingly, in order to avoid a measurement with the movable member being in an unstable state, the form measuring instrument needs to go into a standby mode, which possibly results in a lowered efficiency in operation. In view of the above, the vibration applied to the movable member desirably has a frequency different from the natural frequency of the movable member.

Nonetheless, the frequency of the vibration applied to the movable member is preferably maximized because the influence of the vibration on a measurement result can be prevented through a filtering process or the like (described later).

In the above aspect of the invention, it is preferable that the vibration applied by the vibration generator include a bidirectional vibration including: the first vibration making the stylus holder move around the turn shaft thereof; and a second vibration in a direction intersecting with a direction of the first vibration.

With the above arrangement, even when the first vibration, which makes the stylus holder move around the turn shaft thereof and thus affects the measurement of the profile of the workpiece surface by the tip of the stylus, is reduced, the second vibration applied in the direction intersecting with the direction of the first vibration increases a relative movement of the tip of the stylus to a contact point on the workpiece surface, so that while the friction force of the tip of the stylus on the workpiece surface is sufficiently reduced, the measurement accuracy can be less affected.

In the above arrangement, the directional components of the vibration including different directional components may be repeated at random (i.e., not periodically or regularly).

According to the above aspect of the invention, it is preferable that the vibration generator be adapted to vibrate the stylus holder at a frequency higher than a natural frequency of the movable member, and the displacement detector be adapted to output only a frequency component lower than the natural frequency of the movable member taken from a signal representing the displacement detected at the portion of the stylus holder.

In the above arrangement, the natural frequency of the movable member may be measured and stored in advance. A process to "output only a frequency component lower than the natural frequency of the movable member" may be a so-called filtering process using a low-pass filter. This process may be performed by the controller connected to the displacement detector, a data processor, or the displacement detector itself.

With the above arrangement, the influence of the vibration applied by the vibration generator can be eliminated by simple arrangement and simple process such as filtering on the detected signal, thereby detecting a displacement of the tip of the stylus in a measurement direction, i.e., an unevenness of the workpiece surface.

In the above aspect of the invention, it is preferable that the vibration generator be adapted to vibrate a section defined from the turn shaft of the stylus holder to the tip of the stylus.

With the above arrangement, since the vibration generator applies the vibration near the tip of the stylus relative to the turn shaft of the stylus holder, the vibration can be directly transmitted to the tip of the stylus.

In the above aspect of the invention, it is preferable that the vibration generator be adapted to vibrate the stylus holder.

With the above arrangement, since the vibration applied by the vibration generator is applied to the stylus holder and transmitted to the tip of the stylus via the stylus holder, the stylus and the tip of the stylus can be easily replaced or the like without considering a mechanical relationship of the stylus and the tip of the stylus to the vibration generator.

In the above aspect of the invention, it is preferable that the displacement detector be adapted to detect a displacement of a portion of the stylus holder opposite to the tip of the stylus across the turn shaft.

With the above arrangement, the displacement detector may be installed along the side opposite to the tip of the stylus across the turn shaft of the stylus holder, thereby avoiding, for instance, mechanical interference with the stylus and the tip of the stylus and thus ensuring the installation flexibility. Especially, when the vibration generator is installed near the tip of the stylus relative to the turn shaft of the stylus holder, respective installation spaces can be efficiently ensured.

The above aspect of the invention can provide a form measuring instrument, in which a tip of a stylus is displaced by rotation, capable of bringing the tip of the stylus into stable contact with a workpiece surface.

DESCRIPTION OF EXEMPLARY EMBODIMENT(S)

Exemplary embodiment(s) of the invention will be described below with reference to the attached drawings.

First Exemplary Embodiment

FIGS. 1 to 4 show a first exemplary embodiment of the invention.

Figure 1:
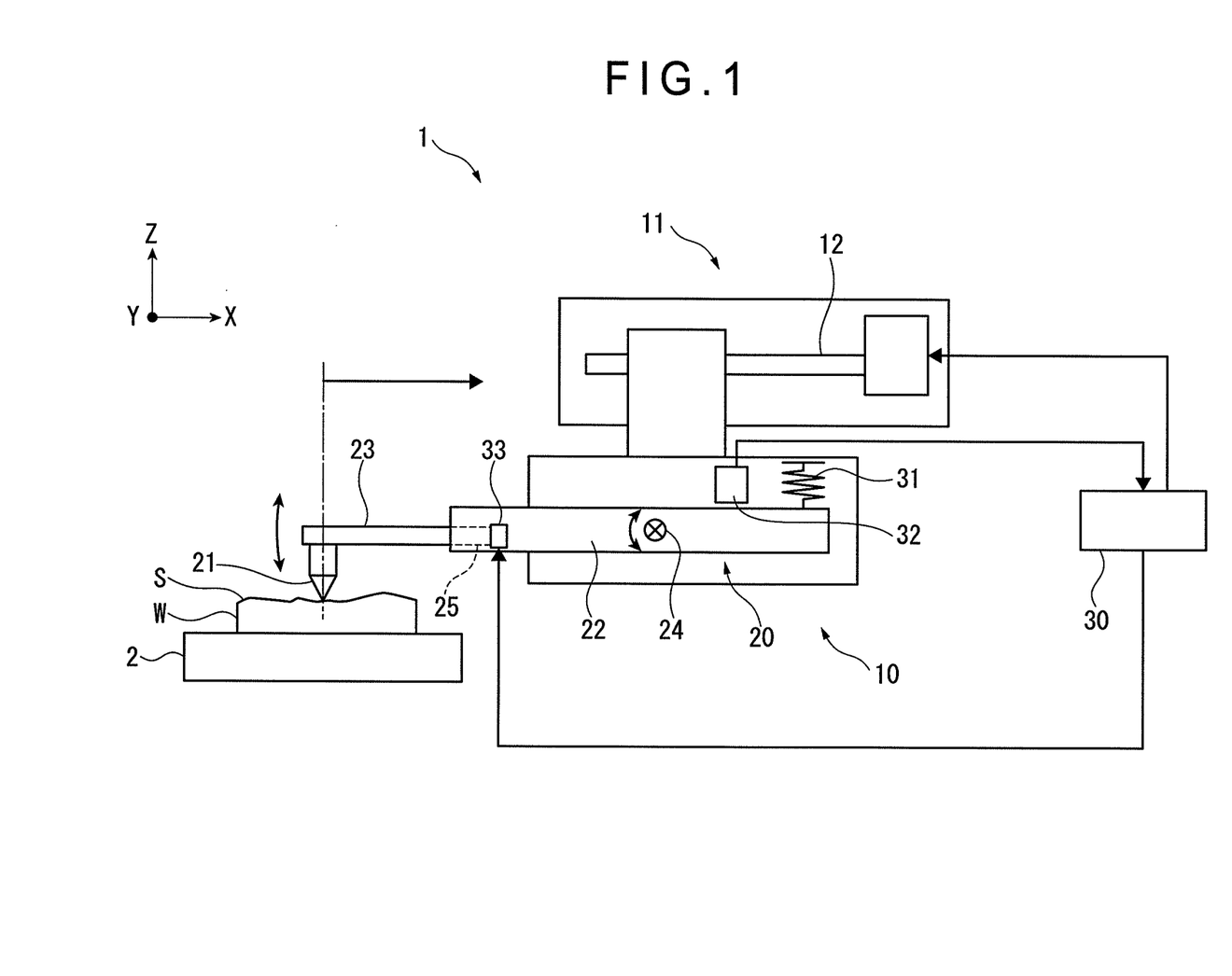
FIG. 1 schematically shows an arrangement according to a first exemplary embodiment of the invention.

As shown in FIG. 1, a form measuring instrument 1 is adapted to measure a surface profile of a workpiece W mounted on a table 2.

Specifically, the form measuring instrument 1 includes: a body 10; a movable member 20 being rotatably supported by the body 10; and a tip of a stylus 21 being provided at an end of the movable member 20, the tip 21 being moved in a measurement direction (an X-axis direction in this exemplary embodiment) for a measurement operation while being in contact with a workpiece surface S. A Z-axial displacement of the tip of the stylus 21 is detected from a rotation condition of the movable member 20 during the measurement operation to measure a surface profile of the workpiece W (a contour in an X-Z plane).

The body 10 is supported by a support 11 and can be moved in the X-axis direction by a feed mechanism 12 provided in the support 11.

The support 11 may be supported by a column (not shown) located near the table 2. Optionally, the support 11 may be vertically movable along the column. Alternatively, the support 11 may be located near the table 2 without using the column. In other words, as long as the tip of the stylus 21 can be in contact with the workpiece surface S and moved in the X-axis direction, the support 11 may be arranged in any manner.

The feed mechanism 12 moves the body 10 relative to the support 11 for the above-described measurement operation and may be provided by a precise mechanical feed mechanism using, for instance, a ball screw extending in the X-axis direction or, alternatively, by a device such as a linear motor capable of a linear motion and a high-accuracy positioning.

A controller 30 is connected to the feed mechanism 12. The controller 30 is provided by a personal computer or the like and controls an operation of the feed mechanism 12 based on a prestored operation program.

The movable member 20 includes: a stylus holder 22 being supported by the body 10; a stylus 23 being held by the stylus holder 22; and the tip 21 projecting downward from one end of the stylus 23.

The stylus holder 22 extends in the X-axis direction and is supported by a turn shaft 24 in a rotatable manner relative to the body 10. When the stylus holder 22 swings, one end of the stylus holder 22 moves in the Z-axis direction.

The stylus 23 is connected to the one end of the stylus holder 22 and extends in the X-axis direction on an extension of the stylus holder 22.

The turn shaft 24 is provided by a ball bearing or a sliding bearing using a low-friction material and is located along an axis in a figure-intersecting direction (i.e., a Y-axis direction intersecting with the X-axis and Z-axis).

The tip of the stylus 21 is fixed to be oriented downward in the Z-axis direction in the vicinity of the end of the stylus 23.

The tip of the stylus 21 is formed in the shape of a round bar as a whole but an end of the tip of the stylus 21 is formed in a conical shape. The conical surface of the tip of the stylus 21 is provided with DLC (diamond-like carbon coating) to ensure wear resistance and low-friction properties.

Figure 2:
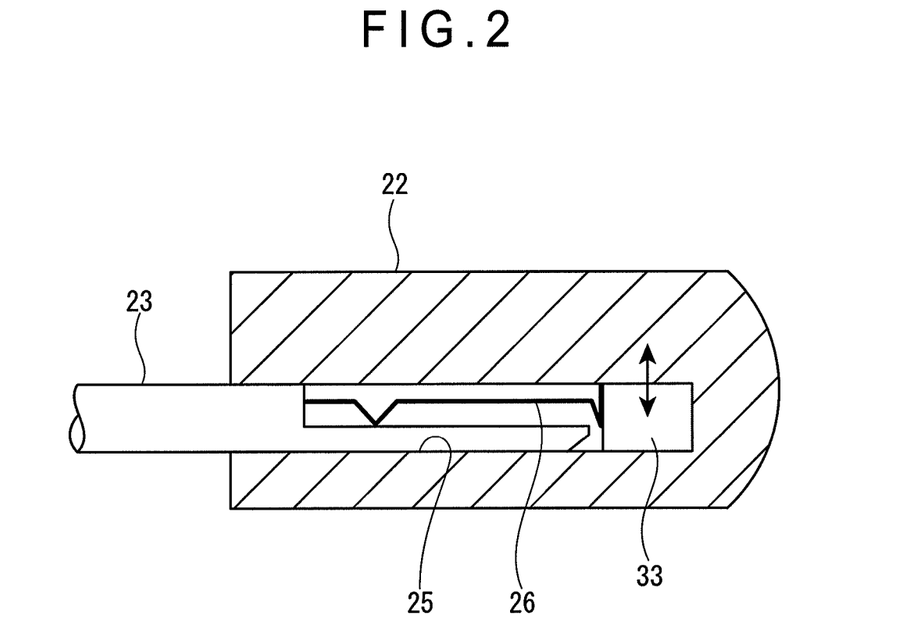
FIG. 2 is an enlarged sectional view showing a relevant part according to the first exemplary embodiment.

As shown in FIG. 2, the stylus holder 22 includes: a connecting portion 25 in which an end of the stylus 23 can be inserted; and a clip member 26 being made of an elastic material, the clip member 26 being located inside the connecting portion 25.

With the above arrangement, when the end of the stylus 23 is inserted in the connecting portion 25, the stylus 23 is held coaxially with the stylus holder 22 while being pressed by the clip member 26 to be prevented from dropping out. The stylus 23 in the above state can be pulled out of the connecting portion 25 with a force larger than a holding force of the clip member 26 in order to replace the stylus 23 with another one.

Referring back to FIG. 1, the form measuring instrument 1 further includes: a measurement-force-applying unit 31 that generates a rotation force acting on the stylus holder 22 to bring the tip of the stylus 21 into contact with the workpiece surface; a displacement detector 32 that is provided to a portion of the stylus holder 22 to detect a displacement of the stylus holder 22 resulting from the rotation thereof; and a vibration generator 33 that applies vibration to the stylus holder 22.

The measurement-force-applying unit 31 is a mechanical biasing unit including a coil spring. The measurement-force-applying unit 31 is located at the side opposite to the tip of the stylus 21 across the turn shaft 24 of the stylus holder 22 and interposed between the body 10 and the stylus holder 22.

The measurement-force-applying unit 31 serves to bias an end of the stylus holder 22 upward in the Z-axis direction while biasing the stylus 23 and the tip of the stylus 21 downward in the Z-axis direction at the opposite side, thereby bringing the tip of the stylus 21 into contact with the workpiece surface S with a predetermined measurement force.

Incidentally, the measurement-force-applying unit 31 may be provided by a device made of an elastomeric material instead of an elastic member such as a coil spring. Further alternatively, the measurement-force-applying unit 31 may be provided by a device capable of electromagnetically generating a measurement force or generating a measurement force using a gravity balance. The measurement-force-applying unit 31 may be installed anywhere on/in the movable member 20 as long as the measurement-force-applying unit 31 can apply the predetermined measurement force.

The displacement detector 32, which is located at the side opposite to the tip of the stylus 21 across the turn shaft 24 of the stylus holder 22, detects a Z-axial displacement of a specific portion of the stylus holder 22 to detect a rotation angle of the stylus holder 22. A Z-axial displacement of the tip of the stylus 21 is calculated from the detected rotation angle and a distance between the tip of the stylus 21 and the turn shaft 24. The signal processing and the calculation are performed by a processing program of the above-described controller 30.

Incidentally, as long as the displacement detector 32 detects a displacement of a portion of the stylus holder 22, the displacement may be electromagnetically detected with a differential coil or the like or may be optically detected.

As also shown in FIG. 2, the vibration generator 33, which is fixed at the innermost of the connecting portion 25 of the stylus holder 22, applies vibration in a direction intersecting with the measurement direction (X-axis direction) to the stylus holder 22, stylus 23 and the tip of the stylus 21.

The vibration generator 33 includes an electrostrictive element such as a piezoelectric element that oscillates in response to an electric signal from the controller 30.

In the form measuring instrument 1 according to the exemplary embodiment, the measurement operation is performed under the control of the controller 30.

For the measurement, as shown in FIG. 1, the workpiece W is mounted on the table 2 and the body 10 is set with the tip of the stylus 21 being in contact with the workpiece surface S.

Subsequently, in response to a control signal sent from the controller 30, the feed mechanism 12 moves the movable member 20 in the X-axis direction and a detection signal from the displacement detector 32 is recorded during the movement of the movable member 20, thereby measuring a profile of the workpiece surface S in the form of a Z-axial displacement along the X axis direction.

During the measurement operation, vibration is applied to the tip of the stylus 21 by the vibration generator 33.

Figure 3:
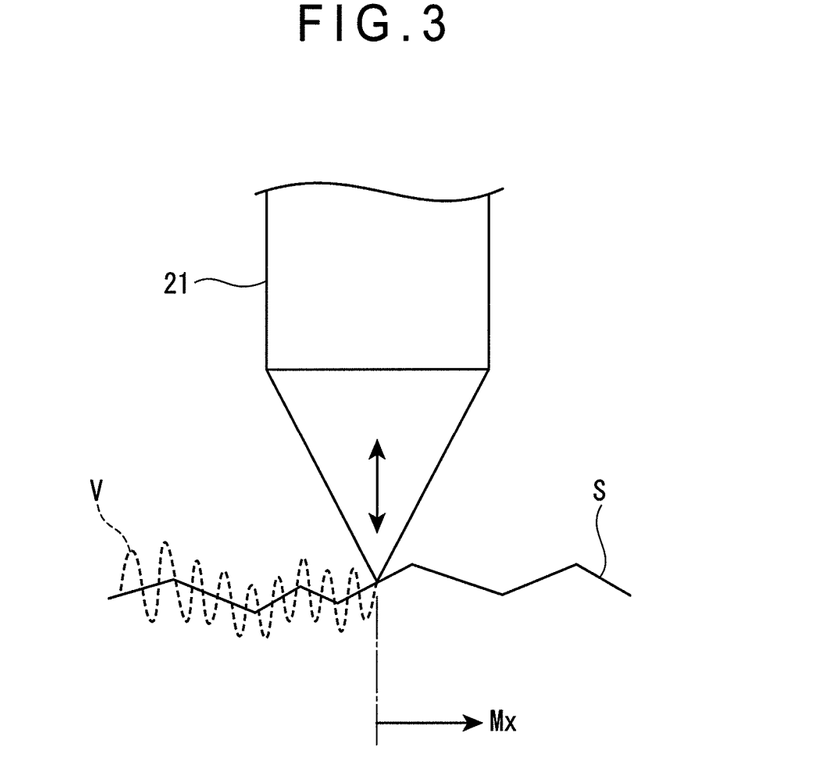
FIG. 3 is an enlarged schematic view showing a contact condition of a tip of a stylus according to the first exemplary embodiment.

As shown in FIG. 3, while being in contact with the workpiece surface S, the tip of the stylus 21 is moved in the X-axis direction (a measurement operation Mx). During the measurement operation, a vibration V is applied from the above-described vibration generator 33 (see FIG. 1).

The application of the vibration V reduces a friction force of the tip of the stylus 21 on the workpiece surface S during the measurement operation Mx to let the tip of the stylus 21 continuously and smoothly move on the workpiece surface S.

Figure 4:
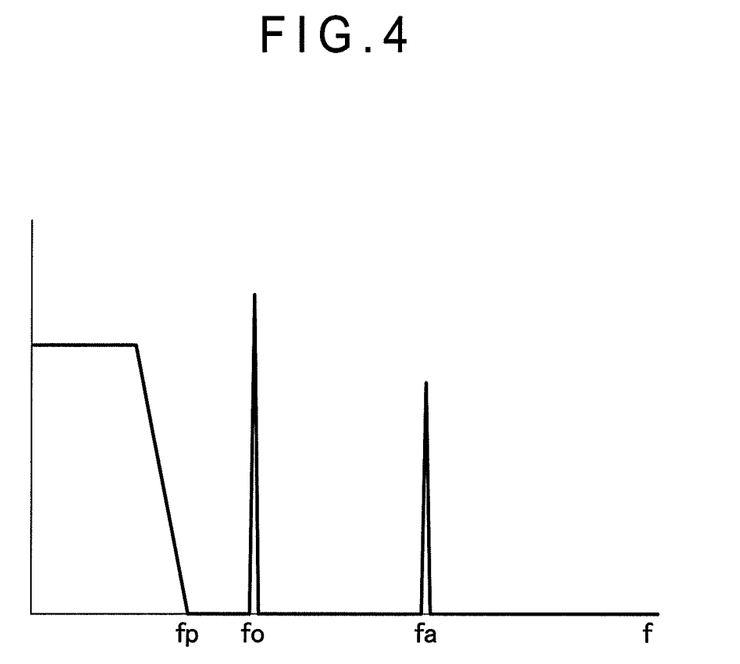
FIG. 4 is a graph showing frequency characteristics according to the first exemplary embodiment.

Incidentally, as shown in FIG. 4, a frequency fa of the vibration V applied by the vibration generator 33 is higher than a natural frequency fo of the movable member 20 in the exemplary embodiment.

The signal from the stylus holder 22 detected by the displacement detector 32 is processed by the controller 30 to be measured as a Z-axial displacement along the X-axis direction. Additionally, the controller 30 performs a low-pass filter processing so that only a frequency component equal to or lower than a frequency fp lower than the natural frequency fo of the movable member 20 passes.

Accordingly, the natural frequency fo of the movable member 20 is measured and stored in the controller 30 in advance.

With the vibration V and the signal processing, the signal detected by the displacement detector 32 is not affected by the vibration V applied by the vibration generator 33, thereby stably and reliably measuring the displacement of the tip of the stylus 21 in the measurement direction (Z-axis direction), i.e., the profile of the workpiece surface S.

As described above, according to the exemplary embodiment, the vibration V applied by the vibration generator 33 serves to reduce the friction force of the tip of the stylus 21 on the workpiece surface S to let the tip of the stylus 21 continuously and smoothly move on the workpiece surface S.

Further, the vibration V applied by the vibration generator 33 is adjusted as shown in FIG. 4 so as not to affect the signal detected by the displacement detector 32, thereby stably and reliably measuring the profile of the workpiece surface S.

Further, according to the exemplary embodiment, the vibration generator 33 is located near the tip of the stylus 21 relative to the turn shaft 24 of the stylus holder 22, thereby reliably and efficiently applying the vibration to the tip of the stylus 21.

Further, the vibration generator 33 is left in the stylus holder 22 even when the tip of the stylus 21 and the stylus 23 are removed for replacement, so that the vibration generator 33 can be shared among a plurality of substitute tips 21 and styluses 23.

Further, the connecting portion 25 intended to connect the stylus 23 is used to install the vibration generator 33 in the stylus holder 22 without using a dedicated enclosure or the like, thereby simplifying the arrangement for easy manufacturing.

Further, according to the exemplary embodiment, the displacement detector 32 is located at the side opposite to the tip of the stylus 21 across the turn shaft 24 of the stylus holder 22, thereby avoiding, for instance, mechanical interference with the stylus 23 and the tip of the stylus 21 and thus ensuring the installation flexibility. Especially, even when the vibration generator 33 is located near the tip of the stylus 21 relative to the turn shaft 24 of the stylus holder 22, respective installation spaces can be efficiently ensured.

Second Exemplary Embodiment

Figure 5:
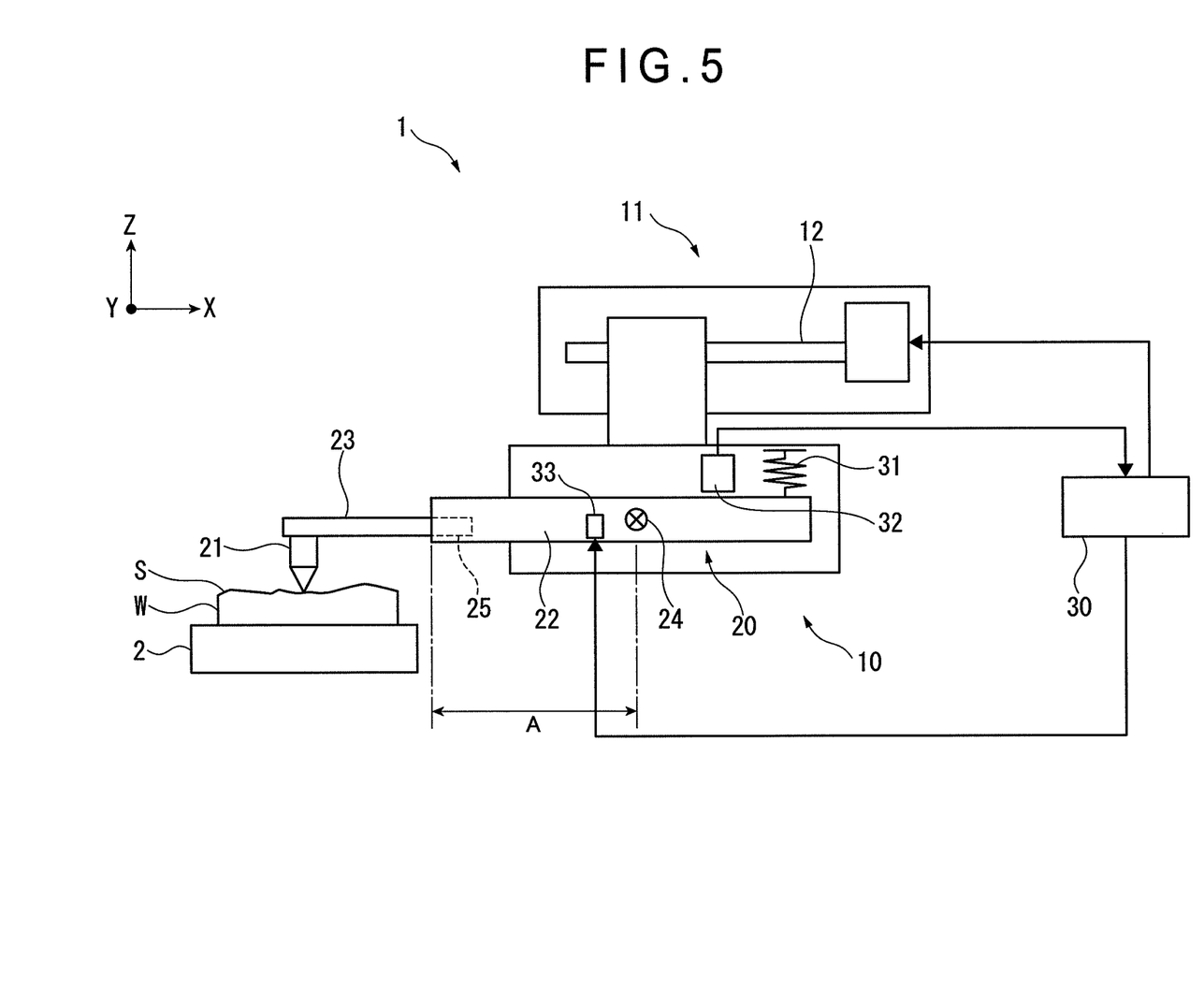
FIG. 5 schematically shows an arrangement according to a second exemplary embodiment of the invention.

FIG. 5 shows a second exemplary embodiment of the invention.

This exemplary embodiment has the same arrangement as the form measuring instrument 1 according to the first exemplary embodiment except that the vibration generator 33 is provided not in the connecting portion 25 but in the vicinity of the turn shaft 24.

This exemplary embodiment also offers the same effects as the first exemplary embodiment.

However, since the vibration generator 33 is not enclosed in the connecting portion 25, this exemplary embodiment requires an additional processing for, for instance, forming a hole or the like in the stylus holder 22 to enclose the vibration generator 33 therein.

Further, the vibration generator 33 is closer to the turn shaft 24 and remoter from the tip of the stylus 21, so that the second exemplary embodiment is inefficient and unfavorable in terms of vibration transmission to the tip of the stylus 21 as compared with the first exemplary embodiment.

Incidentally, when the vibration generator 33 is provided to the stylus 23, the vibration generator 33 is necessarily removed with the stylus 23 for replacement. In contrast, when the vibration generator 33 is located at the opposite side of the stylus holder 22 (i.e., the side opposite to the stylus 23 across the turn shaft 24), the vibration from the vibration generator 33 may be insufficiently transmitted to the tip of the stylus 21.

In view of the above, the vibration generator 33 is preferably located somewhere within a section from the turn shaft 24 to the end of the stylus holder 22 provided with the stylus 23 (i.e., a section A shown in FIG. 5).

Third Exemplary Embodiment

Figure 6:
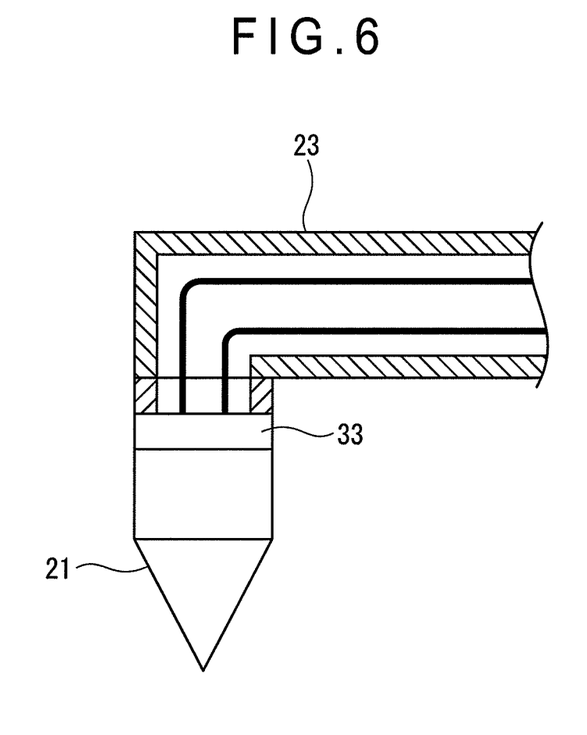
FIG. 6 is an enlarged sectional view showing a relevant part according to a third exemplary embodiment of the invention.

FIG. 6 shows a third exemplary embodiment of the invention.

This exemplary embodiment has the same arrangement as the form measuring instrument 1 according to the first exemplary embodiment except that the vibration generator 33 is provided not in the stylus holder 22 but in the stylus 23 at a portion supporting the tip of the stylus 21.

This exemplary embodiment also offers the same effects as the first exemplary embodiment.

However, since the vibration generator 33 is provided not in the stylus holder 22 but in the stylus 23, the vibration generator 33 is necessarily provided in each of possibly chosen styluses 23, which results in an increased installation cost. Further, replacement of the stylus 23 requires connection and disconnection of a signal line between the vibration generator 33 and the controller 30.

However, since the vibration generator 33 is provided in the stylus 23 at the portion supporting the tip of the stylus 21, the vibration from the vibration generator 33 is directly transmitted to the tip of the stylus 21, thereby maximizing the energy efficiency of the vibration transmission and maximizing the responsibility of the vibration.

Modifications

It should be appreciated that the scope of the invention is not limited to the above exemplary embodiments but modifications and the like that are compatible with an object of the invention are included within the scope of the invention.

For instance, respective installation positions, mechanisms, types of the measurement-force-applying unit 31, the displacement detector 32 and the vibration generator 33 may be altered as necessary. The same applies to the components of the movable member 20 and thus respective shapes and arrangements of the tip of the stylus 21, the stylus holder 22, the stylus 23 and the turn shaft 24 may be altered as necessary.

Although the vibration generator 33 is only intended to apply the vibration V in the exemplary embodiments, the vibration generator 33 may apply, for instance, vibration in the Y-axis direction or X-axis direction intersecting with the Z-axis direction instead of the Z-axial vibration that makes the stylus holder 22 move around the turn shaft 24 thereof. Further alternatively, piezoelectric elements may be assembled together in mutually intersecting directions to provide the vibration generator 33, thereby allowing the vibration generator 33 to apply bidirectional vibration including a vibration Vz in the Z-axis direction and another vibration Vy or Vx in the Y- or X-axis direction intersecting with the Z-axis direction.

Figure 7:
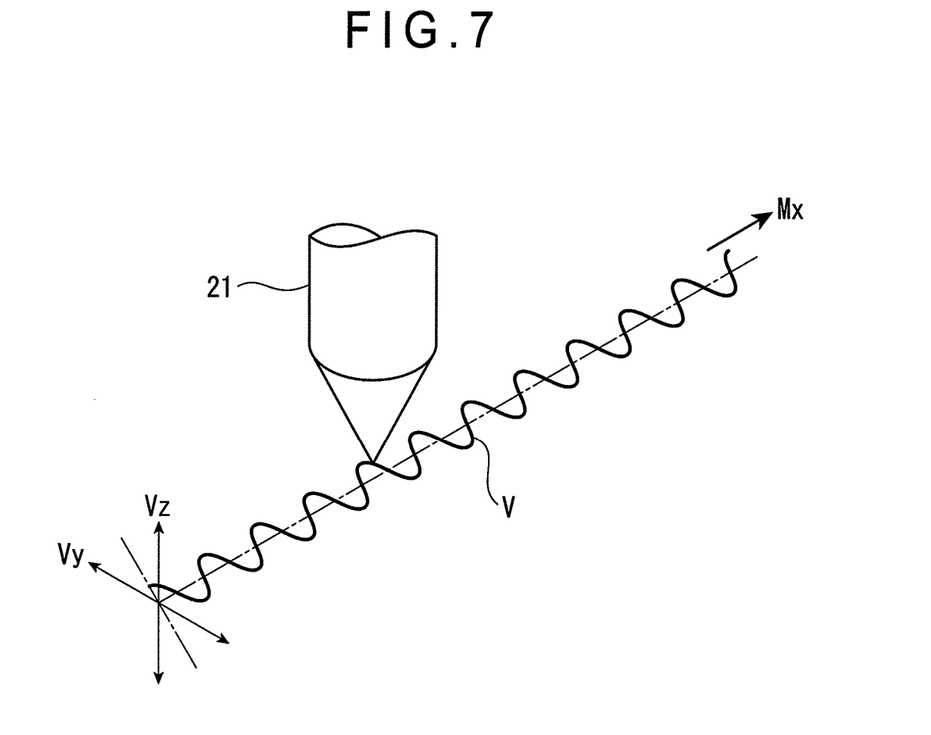
FIG. 7 is a perspective view schematically showing a vibration condition of the tip of the stylus according to a modification of the invention.

For instance, the vibration generator 33 may apply the vibration Vz in the Z-axis direction and the vibration Vy in the Y-axis direction. In this case, the vibration V of the end of the tip of the stylus 21 can have a variety of modes by adjusting a phase difference between the vibrations Vz and Vy. For instance, as shown in FIG. 7, when the phase difference between the vibrations Vz and Vy is 0 degrees, the end of the tip of the stylus 21 can be subjected to the vibration V within an imaginary plane inclined relative to the X-direction and Y-direction.

Such various modes of the vibration V are controllable by an input signal from the controller 30 to the vibration generator 33.

Incidentally, according to the invention, the tip of the stylus is moved along a workpiece surface while being vibrated, thereby avoiding a non-smooth movement (i.e., stick-slip) of the tip of the stylus on the workpiece surface.

Further, the invention is also effective in preventing the tip of the stylus from being caught by a step, a projection or the like on a workpiece surface in cooperation with a conical shape of the tip of the stylus.

In other words, a typical tip of a stylus is formed in a downward-pointing conical shape and the peak of the conical shape is usually brought into slide-contact with the workpiece surface. When the workpiece surface has a discontinuous projecting step, the tip of the stylus may be caught by the step during the movement for the measurement operation to be hindered from moving further.

However, as long as the projecting level of the step from the workpiece surface is smaller than the height of the conical shape of the tip of the stylus, the upper edge of the step comes into contact with a side wall of the conical shape of the tip of the stylus before the peak of the conical shape reaches the step and then the upper edge of the step slides along the slope of the conical shape.

At this time, as long as friction between the surface of the conical shape and the upper edge of the step is reduced, the upper edge of the step smoothly slides on the surface of the conical shape during the movement for the measurement operation and, consequently, the peak of the conical shape reaches the upper edge of the step (i.e., the tip of the stylus finishes climbing up the step) and then passes over the step.

The tip of the stylus cannot smoothly pass over the step unless the upper edge of the step smoothly slides on the surface of the conical shape of the tip of the stylus. In other words, a friction coefficient of the side wall of the cone needs to be reduced for the smooth sliding. In connection with the above, according to the invention, friction is reduced by applying vibration to the tip of the stylus and a DLC coating is applied to the surface of the tip of the stylus, thereby further effectively helping the tip of the stylus pass over the step.

The invention claimed is:

1. A form measuring instrument comprising:
   a body;
   a movable member comprising:
      a stylus holder being rotatably supported by the body;
      a stylus being held by the stylus holder; and
      a tip being provided at an end of the stylus and being contactable with a workpiece surface;
   a measurement-force-applying unit being adapted to generate a rotation force acting on the stylus holder to bring the tip of the stylus into contact with the workpiece surface;
   a displacement detector being provided to a portion of the stylus holder to detect a displacement of the stylus holder resulting from a rotation thereof; and
   a vibration generator being adapted to apply a vibration to the stylus holder,
   wherein the vibration applied by the vibration generator comprises a first vibration that makes the stylus holder move around a turn shaft thereof.

2. The form measuring instrument according to claim 1, wherein the vibration applied by the vibration generator comprises a bidirectional vibration comprising: the first vibration making the stylus holder move around the turn shaft thereof; and a second vibration in a direction intersecting with a direction of the first vibration.

3. The form measuring instrument according to claim 1, wherein
   the vibration generator is adapted to vibrate the stylus holder at a frequency higher than a natural frequency of the movable member, and
   the displacement detector is adapted to output only a frequency component lower than the natural frequency of the movable member taken from a signal representing the displacement detected at the portion of the stylus holder.

4. The form measuring instrument according to claim 1, wherein the vibration generator is adapted to vibrate a section defined from the turn shaft of the stylus holder to the tip of the stylus.

5. The form measuring instrument according to claim 1, wherein the displacement detector is adapted to detect a displacement of a portion of the stylus holder opposite to the tip of the stylus across the turn shaft.

6. A form measuring instrument comprising:
a body;
a movable member comprising:
- a stylus holder being rotatably supported by the body;
- a stylus being held by the stylus holder; and
- a tip being provided at an end of the stylus and being contactable with a workpiece surface;

a measurement-force-applying unit being adapted to generate a rotation force acting on the stylus holder to bring the tip of the stylus into contact with the workpiece surface;
a displacement detector being provided to a portion of the stylus holder to detect a displacement of the stylus holder resulting from a rotation thereof; and
a vibration generator being adapted to apply a vibration to the stylus holder,
wherein the vibration generator is adapted to vibrate the stylus holder at a frequency higher than a natural frequency of the movable member, and
the displacement detector is adapted to output only a frequency component lower than the natural frequency of the movable member taken from a signal representing the displacement detected at the portion of the stylus holder.

7. A form measuring instrument comprising:
a body;
a movable member comprising:
- a stylus holder being rotatably supported around a turn shaft by a surface of the body, a direction of the turn shaft being perpendicular to the surface of the body;
- a stylus being held by the stylus holder; and
- a tip being provided at an end of the stylus and being contactable with a workpiece surface;

a measurement-force-applying unit being adapted to generate a rotation force acting on the stylus holder to bring the tip of the stylus into contact with the workpiece surface;
a displacement detector being provided to a portion of the stylus holder to detect a displacement of the stylus holder resulting from a rotation thereof; and
a vibration generator being adapted to apply a vibration to the stylus holder.

8. The form measuring instrument according to claim 7, wherein the vibration applied by the vibration generator comprises a first vibration that makes the stylus holder move around the turn shaft thereof.

9. The form measuring instrument according to claim 8, wherein the vibration applied by the vibration generator comprises a bidirectional vibration comprising: the first vibration making the stylus holder move around the turn shaft thereof; and a second vibration in a direction intersecting with a direction of the first vibration.

10. The form measuring instrument according to claim 7, wherein
the vibration generator is adapted to vibrate the stylus holder at a frequency higher than a natural frequency of the movable member, and
the displacement detector is adapted to output only a frequency component lower than the natural frequency of the movable member taken from a signal representing the displacement detected at the portion of the stylus holder.

11. The form measuring instrument according to claim 7, wherein the vibration generator is adapted to vibrate a section defined from the turn shaft of the stylus holder to the tip of the stylus.

12. The form measuring instrument according to claim 7, wherein the displacement detector is adapted to detect a displacement of a portion of the stylus holder opposite to the tip of the stylus across the turn shaft.

* * * * *